No. 773,736. PATENTED NOV. 1, 1904.
C. I. HALL.
ROPE GEARING FOR ELEVATORS.
APPLICATION FILED FEB. 25, 1904.
NO MODEL.
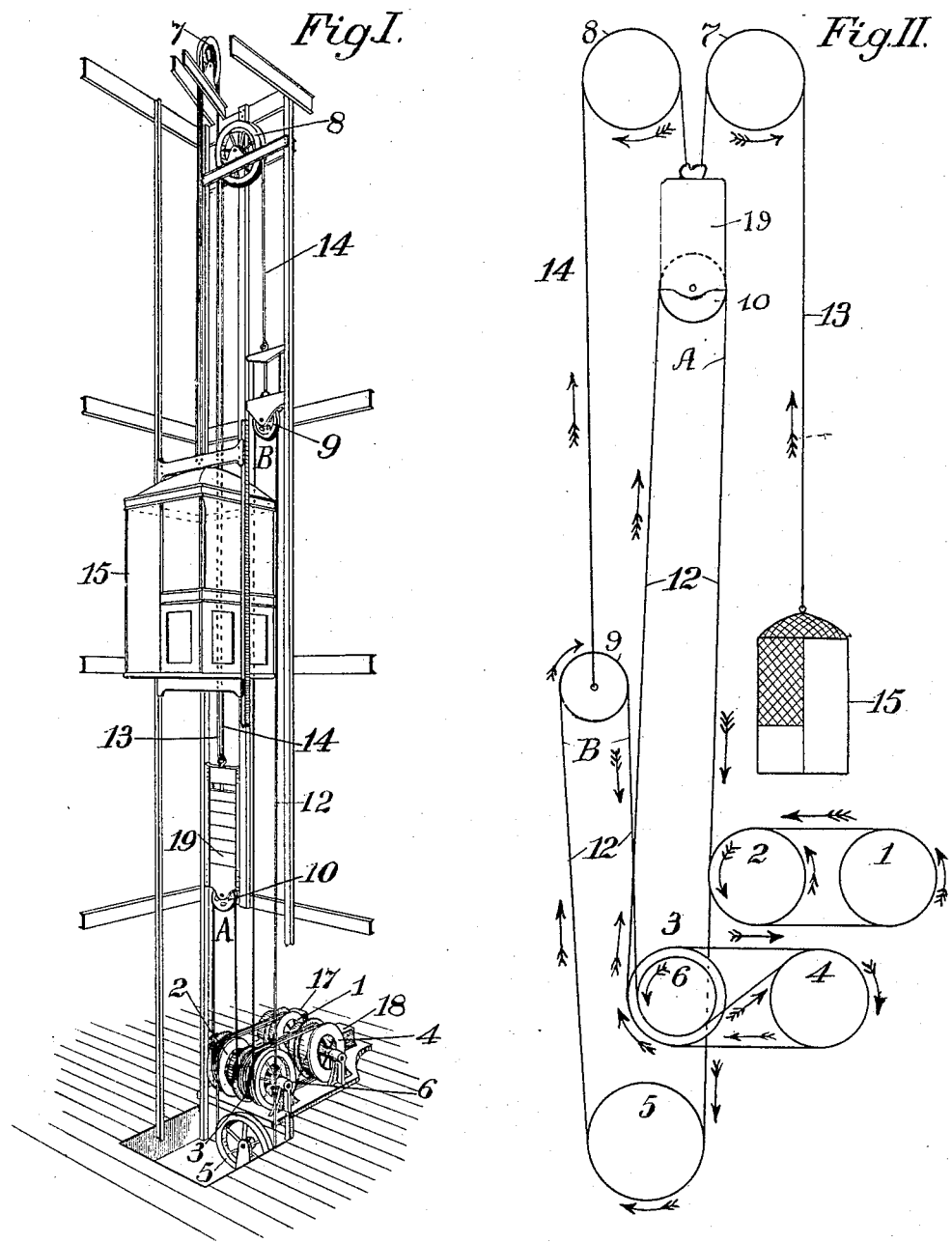
WITNESSES:
Elmer Wickes.
E. A. Brandau
INVENTOR:
Coram I. Hall,
By J. Richards &c.
Atty.

No. 773,736. Patented November 1, 1904.

UNITED STATES PATENT OFFICE.

COFRAN I. HALL, OF SAN FRANCISCO, CALIFORNIA.

ROPE GEARING FOR ELEVATORS.

SPECIFICATION forming part of Letters Patent No. 773,736, dated November 1, 1904.

Application filed February 25, 1904. Serial No. 195,226. (No model.)

*To all whom it may concern:*

Be it known that I, COFRAN I. HALL, a citizen of the United States of America, residing at San Francisco, county of San Francisco, and State of California, have invented certain new and useful Improvements in Rope Gearing for Elevators; and I hereby declare the following to be a full, clear, and exact description of the same, reference being had to the accompanying drawings, forming a part of this specification.

This invention relates to rope gearing to operate elevators for raising and lowering weights and to certain useful improvements in such gearing to make it more reliable and to the manner of operating the same.

My invention consists in an endless rope or ropes wound in multiple wraps around two independent sets or pairs of impelling-pulleys, all of which are driven. These units or pairs of impelling-pulleys are each adapted to raise, lower, start, and stop a load independently one of the other, or when desirable, as in conveying passengers, to be combined and by their differential motion stop a carriage by an easy retarded movement.

A main object of my invention is to provide dual operating apparatus for elevators, so that in case of accident, which most frequently occurs with the impelling apparatus, there will be a relay of gearing ready for immediate use and no detention of service; to permit the employment of pulleys of large diameter moving at their periphery only twice as fast as the load, consequently permitting the use of strong metallic ropes not liable to break or wear out except by long service; also to attain when required easy retardation in stopping and starting load by a combined and differential motion of the two impelling units when both are available, such motion being especially required in a service for passengers.

Referring to the drawings, Figure I shows application of my improved rope gearing to a common elevator. Fig. II is a diagram to indicate the manner of winding, the various pulleys and parts being disposed in one plane and not in their operating position, as in Fig. I.

In the present invention there are two units or sets of impelling apparatus, either one of which can be employed independently to raise, lower, start, and stop the load, but not to stop the same with the ease and smoothness attained by what is called the "differential" manner of operating especially required in passenger service. This ease and control of the motion of passenger-carriages is the main if not the sole object attained by the differential action of differential motion by two sets of operating-gearing.

While the present manner of operating is direct in and dual in all essential respects, I am able to employ when required and when available two sets of motive apparatus differentially to produce an easy motion in stopping a carriage for passengers.

In starting a load by means of electric motors, such as are commonly used, acceleration is provided for by induction in the motor, and differential motion is not required for that purpose.

In the constant-differential system of operating rope elevator-gearing the impelling and traversing pulleys in the bights of the rope are placed in one plane, so the diameter of the pulleys is limited to the lateral distances attainable in this plane, and the impelling-pulleys have to be either superimposed, arranged at differential levels, or be made small in diameter and to revolve at a high rate of speed. If, however, two units of impelling pulleys or apparatus are set with their axes parallel to the plane in which the traversing pulleys move, or at a right angle to the usual position in such gearing, and the leading-in pulley 6 in the present gearing is mounted in the same plane or coaxial with the impelling or traction pulleys, then the latter can be made of any desired diameter, with the advantages that have been pointed out, while the two units may operate independently.

To explain the manner of winding the impelling-rope, the diagram Fig. II will now be referred to.

1, 2, 3, and 4 are traction or impelling pulleys grooved to receive the main or impelling rope. 5, 6, 7, and 8 are deflecting-pulleys to change the direction of the ropes. 9 and 10 are movable or traversing pulleys in the bights of the impelling-rope 12. Beginning at the top of the pulleys 1 and 2, the impelling-rope is wrapped several times around these pulleys, as indicated by arrows, then passes down to and around the idle pulley 5, then upward around the movable pulley 9, then downward and around the deflecting-pulley 6 and diagonally upward to the pulley 4 of the second or relay impelling unit and is wrapped several times around this and the pulley 3, then passes upward and around the movable or shackle pulley 10, and from thence downward to the impelling-pulley 2, around this and the pulley 1 to the point of beginning, as indicated by arrows. The rope 12 wound or wrapped in this manner produces the two bights marked A and B, the rope 12 being long enough for this purpose and in proportion to the range required for the pulleys 9 and 10 or for the range of the weight or load 15, which is attached to the bight A and movable pulley 10 by the rope 13. The movable pulley 9 in the bight B being connected to the movable pulley 10 by the rope 14 compensates or keeps in proper tension the bight B of the endless rope 12 when the bight A, pulley 10, and the load 15 are moved upward or downward. In this manner either one of the two units 1 and 2 or 3 and 4 can be operated, the other remaining still, with all the electric and other parts subject to adjustment or repairing, while the other unit performs all the required functions except the easy stopping motion attainable by a differential combination of the two units.

The two pairs or units of traction or impelling pulleys 1 and 2 and 3 and 4 are driven independently, preferably by electric motors 17 and 18, connected by tangent or other suitable gearing in the usual manner. A common arrangement of the various parts is indicated in Fig. I, a counterweight 19 being added to the movable pulley 10 to produce the required traction of the ropes and to counterweight the carriage 15.

In operating, especially for passenger service, either one of the impelling units or apparatus can be used for all operations; but if it is in order and available it is desirable to start the other unit of impelling-pulleys in the opposite direction instead of stopping the unit in action, thus differentiating the motion of the two and bringing the carriage or load 15 gradually to a state of rest within such a period as circumstances demand. This eliminates from the service, except as to stopping the load, one of the impelling units and by relay of machinery avoids the risk of detention by accidents to this part of the machinery, where derangements frequently occur, at the same time gaining the important structural and operating advantages before pointed out.

It will be understood that each pair or unit of impelling-pulleys has its own controlling means inside the cage within reach of the operator, so that either can be manipulated separately to operate the units independently or separately, as required, the same impelling-rope being connected to both units.

Having thus explained the nature and objects of my invention and the manner of its application in use, what I claim as new, and desire to secure by Letters Patent, is—

1. In rope elevator-gearing, two pairs or units of impelling-pulleys, separately driven, each unit under independent control, so as to raise, lower, start or stop a load by itself, and a common impelling means connected to both units of impelling-pulleys, whereby they may be operated either independently, collectively or differentially, substantially as specified.

2. In rope elevator-gearing, two pairs or units of impelling-pulleys, separately driven, each unit under independent control, so as to raise, lower, start or stop a load by itself, and a common impelling-rope connected to both units of impelling-pulleys, wound on both units, whereby they may be operated either independently, collectively or differentially, substantially as specified.

3. In rope elevator-gearing, two pairs or units of impelling-pulleys, separately driven, each unit under independent control, so as to raise, lower, start or stop a load by itself, a common impelling-rope connected to both units of impelling-pulleys, wound on both units, and deflecting-pulleys to deflect said impelling-rope, one coaxial with one of the impelling-pulleys, and the other set in the elevator-wellway in a plane at right angles to that of the first deflecting-pulley, substantially as specified.

In testimony whereof I have signed my name to this specification in the presence of two subscribing witnesses.

COFRAN I. HALL.

Witnesses:
 ALFRED A. ENQUIST,
 ELMER WICKES.